March 14, 1950 G. E. UNDY Re. 23,208

TIMING CONTROL SYSTEM

Original Filed July 18, 1941 2 Sheets-Sheet 1

INVENTOR
Gustav E. Undy,
BY
Harness, Dickey & Pierce,
ATTORNEYS

TIMING CONTROL SYSTEM
Original Filed July 18, 1941 2 Sheets-Sheet 2
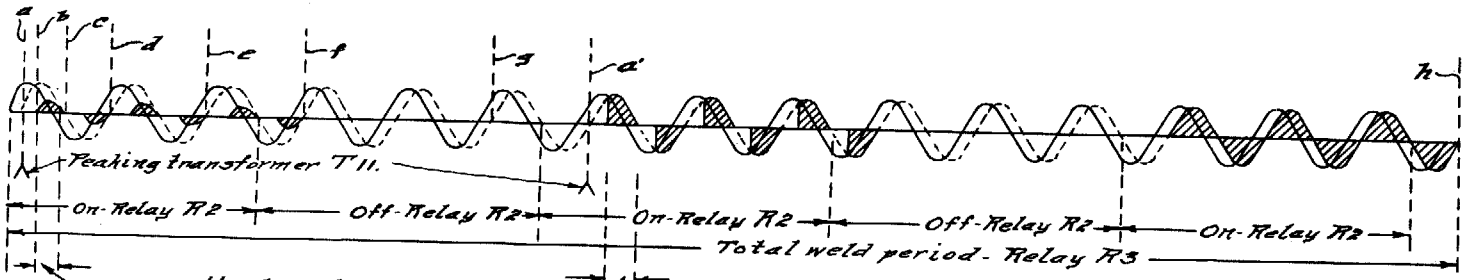
FIG. 2.
FIG. 4.
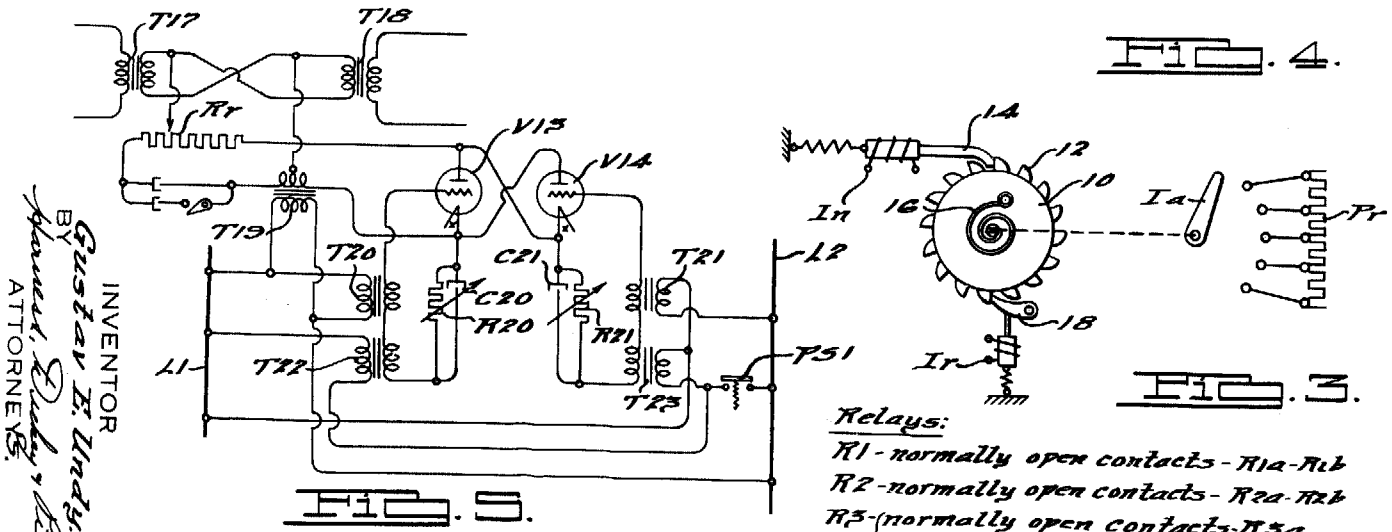
FIG. 3.
FIG. 5.
INVENTOR
Gustav E. Undy.
BY
Harness, Dickey & Pierce
ATTORNEYS.

Reissued Mar. 14, 1950

Re. 23,208

UNITED STATES PATENT OFFICE 23,208

TIMING CONTROL SYSTEM

Gustav E. Undy, Detroit, Mich., assignor, by mesne assignments, to Weltronic Company, Southfield Township, Oakland County, Mich., a corporation of Michigan Original No. 2,401,780, dated June 11, 1946, Serial No. 402,922, July 18, 1941. Application for reissue May 26, 1949, Serial No. 95,506

24 Claims. (Cl. 250—27)

Matter enclosed in heavy brackets [ ] appears in the original patent but forms no part of this reissue specification; matter printed in italics indicates the additions made by reissue

The present invention relates to electrical control systems, and in its herein illustrated form is directed primarily to the provision of an improved welding control system.

The principal objects of the present invention are to provide a control system of the above type, which is simple in arrangement, economical of manufacture, and which is extremely efficient and accurate in its operation; to provide such a system utilizing electronic valves to commutate at least those circuits, the timing whereof is critical; to provide such a system arranged to provide an overall period of welding flow, during which period the welding current is supplied to the welding circuit as a succession of impulses, each whereof is of predetermined length and each whereof is followed by a cooling period of predetermined length; to provide such a system wherein the successive impulses in each welding period are of progressively increasing current intensity; to provide such a system wherein each current impulse is made up of a fraction of each of a predetermined number of half-cycles of current flow of one polarity and a corresponding fraction of each of a predetermined number of half-cycles of opposite polarity and in which the just-mentioned fractions are progressively increased during the welding period; and to provide such a system wherein the increase in the aforesaid fractions of current intensity is effected by indexing means which functions automatically as a consequence of the initiation of the welding period and which automatically resets itself at the conclusion of the welding period.

Further objects of the present invention are to provide a control system of the above-indicated type, embodying improved means for causing each impulse of welding current flow to be introduced by a half-cycle or fraction of a half-cycle of one polarity and to be terminated by a half-cycle or a fraction of a half-cycle of opposite polarity; to provide such a system wherein each operation of the primary control means produces at least two electrical impulses having a displacement of 180 electrical degrees, one of said electrical impulses resulting in the delivery to the welding circuit of an impulse of welding current of one polarity and the other said electrical impulse resulting in the delivery to the welding circuit of an impulse of welding current of opposite polarity; and to provide such a system wherein the aforesaid electrical impulses are produced by a common impulse producing means which upon being actuated immediately produces the first said electrical impulse and stores energy which is released a half-cycle later, so as to produce the second-mentioned electrical impulse.

With the above, as well as other and more detailed objects in view, a preferred but illustrative embodiment of the invention is shown in the accompanying drawings, throughout the several views of which corresponding reference characters are used to designate corresponding parts and in which:

Fig. 2 is a diagrammatic representation which illustrates certain of the timing relations provided by the system of Fig. 1;

Fig. 3 is a legend which indicates the mechanical relation between the solenoids and the contacts which are operated thereby in the system of Fig. 1;

Fig. 4 is a diagrammatic view, illustrating the construction of an indexing relay utilized in the system of Fig. 1; and Fig. 5 is a diagrammatic view of circuits illustrating a modified arrangement.

Figure 1:
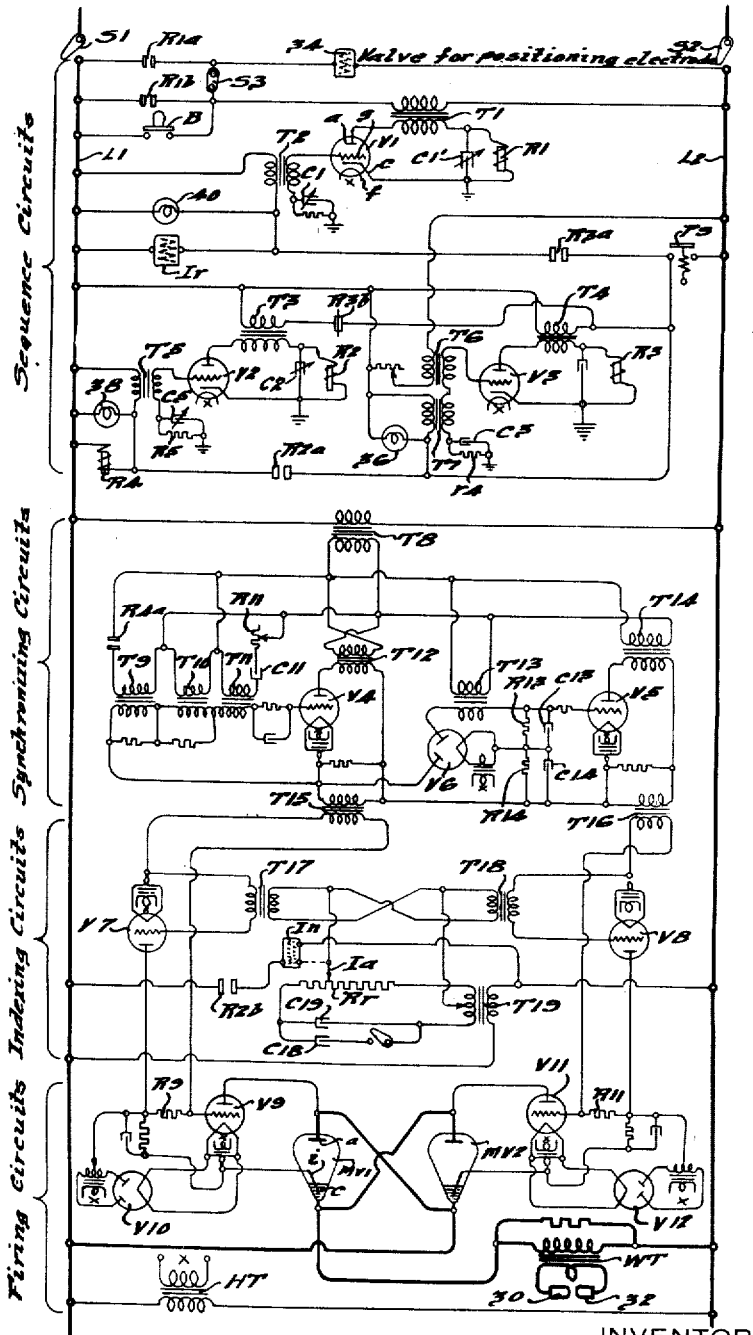
Figure 1 is a diagrammatic view of a welding control system embodying the invention.

It will be appreciated from a complete understanding of the present invention that, in a generic sense, the improvements thereof may be embodied in electrical control systems intended for various specific purposes, and that such control systems may be variously arranged. In its present preferred form, the invention is utilized to control electric welding circuits of the impulsing type, and by way of illustration but not of limitation, the invention is so disclosed herein.

Referring to Fig. 1, the present control system comprehends four interrelated groups of circuits, as indicated by the legends appearing along the lefthand side of the diagram. The first of these sets of circuits controls what is known in the trade as the sequencing of the system. That is to say, these circuits respond to a manual or other suitable operator, indicated herein as a push button B, and serve to operate the mechanism which brings the electrodes into clamping engagement with the work and releases such clamping engagement to initiate a sequence of operations, which results in the initiation of flow of welding current, to control the length of each impulse of welding current and the interval between each such impulse, and to determine the overall length of the welding period.

The second group of circuits, indicated by the legend "Synchronizer," responds to the sequence circuits, and serves to cause each impulse of welding current to be introduced by a fraction or all of a half-cycle of one polarity and to be terminated by all or a fraction of a half-cycle of opposite polarity.

The third group of circuits, indicated by the legend "Indexing circuit" cooperates with the synchronizing circuits in controlling the initiation of each impulse of welding current, and serves to determine the fraction of each half-cycle of the supply source during which welding current is delivered to the welding circuit.

The remaining group of circuits, indicated by the legend "Firing circuits," responds to the sequence synchronizing and indexing circuits, and serves to directly initiate and interrupt the flow of welding current to the welding transformer.

The sequencing circuits embodying the invention are disclosed and claimed in the copending application of Cletus J. Collom, Serial No. 222,825, filed August 3, 1938, Patent No. 2,289,320, dated July 7, 1942, and assigned to the assignee hereof, and as shown, utilize a series of three electronic valves V1, V2 and V3, a corresponding series of solenoid operated relays R1, R2 and R3, together with a fourth such relay R4, and a series of transformers T1 through T7, which are associated with the grid and plate circuits of the electronic valves in the hereinafter described relation. The valves V1, V2 and V3 may be and preferably are of the evacuated type, each having an anode a, a control grid g, a cathode c, and a filament f. As will be understood, these valves are of the type which are non-conducting so long as the potential between the grid and cathode is below a critical value and may be rendered conducting during half cycles in which the anode is positive with respect to the cathode by increasing such potential above the critical value. The relays R1, R2, R3, and R4 are of conventional type and are provided with normally open and normally closed contacts in the relation specified in the legend, Fig. 3. It is thought that the remaining details of the sequence circuits may best be understood by a description of the operation of the system.

The synchronizing circuits embody certain improvements upon the invention described and claimed in the copending application of Cletus J. Collom, Serial No. 325,553, filed March 23, 1940, Patent No. 2,289,321, dated July 7, 1942, and utilize a pair of related valves V4 and V5 and a cooperating full wave rectifier V6. Valves V4 and V5 may be and preferably are of the gas filled type and are each provided with an anode. It will be appreciated that while these valves are normally non-conducting, they may be rendered conducting by applying critical potential between the grids and cathodes thereof during half-cycles in which the anodes are positive, and that when so rendered conducting, they remain so for the balance of the corresponding half-cycle of current flow. The valve V4 is provided with input and output transformers T12 and T15, respectively, and with grid transformers T9, T10 and T11. The valve V5, in turn, is provided with input and output transformers T14 and T16, respectively, and is provided with a grid transformer T13. As is described in more detail below, the grid transformer T10 serves to normally apply a potential to the grid of the valve V4, which is 180° out of phase with the plate voltage thereof, and consequently normally maintains valve V4 in non-conducting condition. Transformer T11 applies to the grid of valve V4, in each successive half-cycle, a voltage of peaked wave form, at a time in each half-cycle which is determined by the associated phase shift elements R11 and C11. The peaked voltages thus applied to the grid of valve V4 by transformer T11 are not of sufficient value to overcome the bias of transformer T10 except during half-cycles in which transformer T9 is energized. The latter transformer, when energized, neutralizes the effect of transformer T10, and transformer T9 is periodically energized in accordance with the operation of relay R4, which responds, as described below, to the aforesaid sequencing circuits. The connections for valve V4 and its related transformers are such that the critical or operating voltage is applied to the grid thereof only during positive half-cycles.

The connections for transformer T14, associated with valve V5, are the reverse of those for transformer T12, and consequently, valves V4 and V5 are disposed to be rendered conducting during alternate half-cycles. For purposes of description, as aforesaid, the half-cycles in which valve V4 passes current are herein referred to as the positive half-cycles, and consequently the half-cycles in which valve V5 conducts, are herein referred to as the negative half-cycles. Transformer T13 and rectifier V6 cooperate to maintain a negative bias on the grid of valve V5 during the negative half-cycles, and for this purpose, the output of rectifier V6 is delivered to a condenser C13, which is connected in parallel with an associated resistor R13. In order to render valve V5 conducting in a negative half-cycle immediately following a positive half-cycle in which valve V4 has conducted current, the output circuit of valve V4 is connected, through rectifier V6, to apply charging current to condenser C14, which is provided with a discharge resistor R14. The relation is such, as is described in more detail below, that during each positive half-cycle of current flow, in which valve V4 conducts, condenser C14 is charged to a potential sufficiently above the charging potential of condenser C13 to bring the grid of valve V5 to a potential at which, if the anode of valve V5 were positive, valve V5 would conduct current. During the positive half-cycle in question, the anode of valve V5 is negative, and consequently, the application of this charge to condenser C14 does not initiate a flow of current through valve V5. At the beginning of the immediately following negative half-cycle, however, the anode of valve V5 becomes positive with respect to the anode, and as soon as the critical anode-cathode voltage across valve V5 is reached, a flow of current is initiated through valve V5.

During that part of the positive half-cycle in which condenser C14 is charged and throughout which the potential applied to condenser C14 is below the maximum charging potential thereof, condenser C14 is enabled to discharge through the discharge resistor R14. The characteristics of this discharge circuit are such that the charge on condenser C14 remains at a sufficiently high value to maintain a conducting potential on the grid of valve V5 long enough to initiate the discharge of the latter at the beginning of the next negative half-cycle, as aforesaid. The characteristics of the discharge circuit for condenser C14 are, however, such that if another charging current is not applied to condenser C14 in the next succeeding positive half-cycle, the charge thereon will have fallen to such a value that, by the time the next succeeding negative half-cycle is initiated, the biasing condenser C13 is able to apply a blocking potential to the grid of valve V5. Valve V5 is, therefore, rendered conducting at the beginning of each negative half-cycle, which follows a positive half-cycle in which valve V4 conducts current.

The output circuit of valve V4 is coupled, through transformer T15 and valve V7, to the grid circuit of the firing valve V9, and the output circuit of valve V5 is correspondingly related, through transformer T16 and valve V8, to the grid circuit of the firing valve V11. Valves V7, V8, V9 and V11 are preferably of the same type as valves V4 and V5, and the associated rectifiers V10 and V12 are preferably of the same construction as rectifier V6.

Rectifiers V10 and V12 are conventionally connected to normally apply negative bias voltages to the grids of valves V9 and V11, respectively, which bias voltages are 180° out of phase with the anode voltages thereof and which, consequently, normally maintain valves V9 and V11 in a non-conducting condition. The voltages for overcoming the just-mentioned bias voltages are applied across the related resistors R9 and R11, respectively, and are applied through the valves V7 and V8.

It will be appreciated, therefore, that the time in each positive half-cycle at which valve V9 is rendered conducting is determined by the time in such half-cycle at which valve V7 is rendered conducting. Similarly, the time in each negative half-cycle at which valve V11 is rendered conducting is determined by the time in such negative half-cycle at which valve V8 is rendered conducting. In accordance with the present invention, the grid potentials of valve V7 and V8 are controlled, respectively, by the associated transformers T17 and T18, which derive energy from a timing transformer T19. The midpoint of the secondary winding of transformer T19 is connected to one terminal of transformer T17 and to an opposite terminal of transformer T18. The secondary circuit of transformer T19 includes a potentiometer resistor Pr and also includes in parallel a plurality of condensers C18 and C19. Resistor Pr is provided with a movable tap Ia, which is directly connected to the remaining terminals of the secondary windings of transformers T17 and T18. The constants of the just-mentioned secondary circuit, associated with transformer T19, are such, as will be understood, that for each position of the adjustable tap Ia along the resistor Rr, the maximum voltage developed by transformers T17 and T18 is of a substantially fixed value, but the position of the tap Ia along the resistor Rr determines the point in each half-cycle at which such maximum voltage is reached. Thus, by progressively advancing the tap Ia along the resistor Rr, the point in each positive half-cycle at which transformer T17 becomes effective to initiate a discharge through valve V7 may be varied throughout a range of substantially 180°. The same adjusting movement of the tap Ia correspondingly adjusts the time in each negative half-cycle at which transformer T18 is effective to initiate a discharge through the valve V8. Preferably and to insure smooth progression in the firing points of valves V7 and V8, condensers C18 and C19 are proportioned so that the voltage across the potentiometer resistor Rr is leading with respect to the voltage transformer T19, it being understood, of course, that with this relation the connections for transformers T17 and T18 are such that the voltages of these transformers lag the voltage of transformer T19, which is in phase with the voltage across the welding transformer.

It will be appreciated that the expedient of dividing each over-all welding period of welding current flow into a succession of predeterminably spaced impulses has been resorted to in the trade, both for the purpose of protecting the welding electrodes and for the purpose of promoting a desired diffusion of the heat through the work to be welded. In present day welding practice, it is conventional to provide each electrode with artificial cooling means, and these artificial cooling means may be expected to return the associated electrode to a normal or cold condition in the interval between successive impulses of welding current. During the course of each such impulse, on the other hand, the electrodes rise in temperature.

It has been found in accordance with the present invention that the efficiency of certain types of welds may be materially increased, and the life of the electrodes may be prolonged if the intensity of the welding current is varied in accordance with a predetermined pattern during each over-all period of welding current flow. More particularly, it has been found that decided improvements can be effected by progressively increasing the welding current intensity from a minimum value during the first impulse to a maximum value in the last one or several impulses.

Accordingly, in accordance with the present invention, means comprising an indexing relay are provided to progressively advance the potentiometer tap Ia during each welding period. The indexing relay is provided with two coils designated In and Ir in Fig. 1, which function, respectively, to advance the tap Ia in step-by-step fashion, and to restore the same to a starting position.

The indexing relay may be of conventional construction, a suitable structural arrangement being diagrammatically shown in Fig. 4. In the latter figure, the potentiometer tap Ia is suitably connected to a ratchet disc 10, having circumferentially distributed teeth 12 on the surface thereof, which cooperate with a pawl 14. The pawl 14 is disposed for operation by the advancing solenoid In. The disc 10 is continuously urged in a resetting or counterclockwise direction by a spiral spring 16, and a holding pawl 18 is provided, which normally prevents such a resetting movement.

The resetting pawl 18 may be swung to retracted positions in order to freely enable the ratchet disc 10 to rotate to its starting position, and for this purpose, pawl 18 is coupled to the armature of the resetting solenoid Ir. During such resetting movement, as will be understood, the teeth 12 force pawl 14 to the left, enabling such teeth to pass thereby. As to operation, it will be understood that a momentary energization of the advancing coil In is effective to advance the tap Ia from the starting position of Fig. 4 to a position in which it engages the contact 20. Upon being de-energized, the armature of solenoid In is returned to its normal position by the associated spring 22. A return movement of the disc 10 is, however, prevented by the pawl 18. Successive energizations of the solenoid In correspondingly produces step-by-step advancing movements of the tap Ia. If the solenoid Ir is energized, the pawl 18 is withdrawn from co-operative relation to the ratchet teeth 12 and enables the return spring 16 to restore the disc 10 and the tap Ia to the illustrated starting position.

Referring again to Fig. 1, the advancing solenoid In is arranged to be energized each time the hereinafter described impulsing relay R2 is energized, and for this purpose, relay contacts R2b are interposed in the circuit connections for the solenoid In. The resetting solenoid Ir, on the other hand, is normally de-energized, but is energized at the end of the welding period, at which time, as described below, the contacts R3a of the timing relay R3 are momentarily closed.

The firing valves V9 and V11 are conventionally connected between the anodes a and the igniter electrodes i of a pair of main gaseous discharge rectifiers MV1 and MV2. The latter rectifiers are reversely connected in circuit with the primary winding of the welding transformer WT, and may be and preferably are of the type sold commercially under the trade-name "Ignitron." As will be understood, these rectifiers, while normally non-conducting, become conducting if a critical potential is applied between the anodes and igniter electrodes thereof during a half-cycle in which the anodes are positive. When so rendered conducting, the rectifiers remain so for the balance of the corresponding half-cycle of current flow.

The valves V9 and V11, respectively are provided with full wave rectifiers V10 and V11, which normally apply negative biases to the grids of the associated valves V9 and V11, so as to maintain these valves normally non-conducting which action, as will be understood, maintains the main rectifiers MV1 and MV2 normally non-conducting.

It is thought that the remaining details of the system may best be understood with reference to a description of the operation of the system. Assuming it is desired to condition the system for operation, the usual disconnect switches S1 and S2 may be closed, thereby connecting the line conductors L1 and L2 to the source of supply, which may be a conventional 60 cycle alternating current system.

The energization of line conductors L1 and L2 immediately energizes transformer T6, associated with the sequencing valve V3; transformer T8, which supplies power to the synchronizing, indexing and firing control circuits; energizes a heater transformer HT to the secondary terminals whereof the reference character x is applied; and energizes the grid control transformer T19, associated with valves V7 and V8.

Upon being energized, the heater transformer applies heating current to the filaments f of the sequencing valves V1, V2 and V3, and also applies heating current to the cathodes of the synchronizing valves V4 and V5, the rectifier V6, the indexing valves V7 and V8, the firing valves V9 and V11, and the rectifiers V10 and V12, to which filaments and cathodes the reference character x is also applied.

Upon being energized, transformer T6 applies a negative bias to the grid of the sequencing valve V3, which action renders the same non-conducting and prevents energization, for the time being of the over-all timing relay R3.

Upon being energized, transformer T8 applies energizing currents to the input transformers T12 and T14, associated with valves V4 and V5, and also energizes the bias transformers T10 and T13, associated with the grid circuits of valves V4 and V5. The connections for transformer T10 are such that upon being energized, this transformer applies a negative bias to the grid of valve V4 and maintains the same non-conducting. Similarly, transformer T13 is effective to charge condenser C13 through rectifier V6 and apply a negative bias to the grid of valve V5, thereby normally maintaining the same non-conducting. The energization of the input transformers T12 and T14 is consequently without immediate effect.

The energization of transformer T8 also energizes the peaking transformer T11, which is associated with the grid circuit of valve V4 and which transformer may be conventionally constructed so as to deliver a voltage wave of peaked form. The connections for transformer T11 are such as to apply a positive potential to the grid of valve V4 in each positive half-cycle of the source, that is to say, in each half-cycle in which the transformer T12 renders the anode of valve V4 positive. As will be understood, the point in each such positive half-cycle at which the maximum potential of transformer T11 is developed is adjustable by varying the illustrative phase shift elements R11 and C11, associated with the primary winding of transformer T11, and preferably the adjustment is such that the maximum potential is applied at the point designated a in Fig. 2, which point corresponds to the zero point of the hypothetical welding current wave I. It will be noted that in Fig. 2 the just-mentioned current wave I lags with respect to the voltage wave E, which latter wave indicates the voltage applied between the line conductors L1 and L2. As aforesaid, the potential developed by transformer T11 is insufficient to overcome the effect of the bias transformer T10, and consequently valve V4 remains non-conducting until such a time as transformer T9 is energized, as described below.

The energization of transformer *T19* delivers current through the potentiometer circuit comprising the resistor *Rr* and the associated condensers C18 and C19 to the transformers T17 and T18. The latter two transformers are connected respectively, to apply a conducting potential to the grid of valve V7 in each positive half-cycle, and to apply a conducting potential to the grid of valve V8 in each negative half-cycle. As aforesaid, the point in each such positive and negative half-cycles at which the grids of valves V7 and V8, respectively, reach their conducting potentials is determined by the setting of the tap Ia along the potentiometer resistor *Rr* and in accordance with the preferred practice of the invention, the normal such positioning is one which delays the application of such conducting potentials until the time represented by the vertical line b in Fig. 2, which, as described below, prevents the firing of the main rectifiers MV1 and MV2 until late in each corresponding half-cycle, and consequently delivers current of relatively low intensity to the welding transformer WT.

Assuming the work has been positioned between the electrodes 30 and 32, which are herein illustrated as conventional spot welding electrodes, a welding operation may be initiated by closing the pilot switch B. The latter action completes an obvious energizing circuit for the solenoid 34, which is illustrative of a conventional electromagnetically operated valve which may be associated with the usual means, not shown, for actuating the electrodes 30 and 32 into clamping engagement with the work with a suitable welding pressure.

Closure of the switch B also completes an obvious energizing circuit for the primary winding of the transformer T1, associated with valve V1. Under the conditions stated, the transformer T2 is de-energized and consequently the grid of valve V1 is at a conducting potential. Accordingly, upon being energized, transformer T1 is enabled to pass current through the valve V1 and energize the sequencing relay R1, which thereupon closes its contacts R1a and R1b.

Contacts R1a and R1b are connected in parallel with each other through the now closed change-over switch S3, and in the instance now being described, function jointly to complete a self-holding circuit for the valve solenoid 34 and transformer T1.

The energization of solenoid 34, as described above, results in bringing the electrodes 30 and 32 into engagement with the work, and the pressure thus developed functions in a well known manner to close the conventional spring biased pressure switch PS. Closure of switch PS immediately completes energizing circuits for the transformers T3 and T4, associated with valves V2 and V3, and also energizes transformer T7, which is associated with the grid circuit of valve V3. Closure of the pressure switch PS also completes an obvious circuit for the indicating lamp 36, which thereupon lights up and remains lighted until the welding cycle is completed.

Under the conditions stated, transformer T5 is de-energized and, consequently, upon being energized, transformer T3 is enabled to pass current through valve V2 and energize impulsing relay R2.

Upon being energized, relay R2 closes its contacts R2a and R2b. Contacts R2b complete an obvious energizing circuit for the advancing coil In of the indexing relay, which thereupon operates, as described with reference to Fig. 4, to advance the potentiometer tap Ia to the minimum current setting. Closure of contacts R2a completes obvious energizing circuits for transformer T5, indicating lamp 38 and the winding of control relay R4. As will be understood, lamp 38 serves to indicate the on and off condition of the implusing circuit comprising relay R2.

Upon being energized, relay R4 closes its contacts R4a, which are associated with transformer T9 in the synchronizing circuits. The effect of this action is described below.

The energization of transformer T5 results in the charging up of the variable off-time condenser C5, which action applies a blocking potential to the grid of valve V2 and immediately interrupts the flow of current therethrough.

When the flow of current through valve V2 is interrupted, the energy previously stored in the variable on-time condenser C2 by transformer T3 is enabled to discharge through the winding of relay R2, and this energy maintains relay R2 energized for a predetermined interval. In the diagrammatic view of Fig. 2, the on period of relay R2 is indicated as being approximately three full cycles in length. It will be made clear at a later stage of the description that an accuracy of plus or minus one half-cycle in the timing of condenser C2 is sufficient.

As soon as condenser C2 times out, relay R2 resumes the de-energized position, re-opening its contacts R2a and R2b. The opening of contacts R2b is without effect because of the holding action of the pawl 18, associated with the indexing relay. The opening of contacts R2a de-energizes the control relay R4 (which thereupon opens its contacts R4a) and also de-energizes transformer T5 and extinguishes lamp 38.

The de-energization of transformer T5 enables the energy previously stored in the off-time condenser C5 to start discharging through the associated resistor R5. At the expiration of an interval determined by the characteristics of condenser C5 and resistor R5, the grid of valve V2 becomes sufficiently positive to enable transformer T3 to again pass current through valve V2. The off-time interval thus afforded by condenser C5 may obviously be extended for any desired period, an off-time of approximately three cycles in length being indicated in Fig. 2. As appears in the later description, an accuracy of plus or minus one half-cycle in the timing afforded by condenser C5 is satisfactory.

As soon as valve V2 again becomes conducting relay R2 is again energized with the result mentioned above. As before, also, the energization of relay R2 applies a blocking potential to the grid of valve V2, which results in the de-energization of relay R2. So long as transformer T3 is energized, therefore relay R2 alternates between energized and de-energized conditions, the length of each energized period being determined by condenser C2 and the length of each de-energized period being determined by condenser C5. So long, also, as relay R2 is energized, control relay R4 is energized and each energization of relay R2 causes the indexing relay to advance the potentiometer tap Ia one step.

The energization of transformer T7 neutralizes the effect of the blocking transformer T6, associated with valve V3, and ultimately results in the energization of relay R3 to thereby limit the welding period. Since the functioning of relay R3 is delayed until the end of the welding period, a detailed description of its energization is deferred until a later stage of the description.

Each closure of contacts R4a of relay R4 completes an obvious energizing circuit for the primary winding of transformer T9, which is differentially connected with respect to transformer T10 and neutralizes the effect of transformer T10 to a sufficient extent to enable the peaked potential of transformer T11 to bring the grid of valve V4 to a conducting value. It will be recalled from previous description that at the stage indicated by the reference character a in Fig. 2, of each successive half-cycle of the voltage wave E, transformer T11 develops the just-mentioned peaked potential. During negative half-cycles, the anode of valve V4 is negative, and consequently a neutralization of the effect of transformer T10 during a negative half-cycle is without effect. At the point a (Fig. 2) of the next positive half-cycle, following the neutralization of transformer T10, however, the peaked potential developed by transformer T11 is enabled to initiate a discharge of valve V4, in consequence of which the input transformer T12 is enabled to pass current through valve V4 and energizes the output transformer T15. Transformer T12 is also enabled to pass current through rectifier V6 and charge condenser C14 to a predetermined potential. As aforesaid, the fully charged potential of condenser C14 materially exceeds the fully charged potential of condenser C13, thereby immediately enabling condenser C14 to bring the grid of valve V5 to a conducting potential. During the half-cycle in question, however, the anode of valve V5 is negative and consequently no current passes therethrough.

Upon being energized, output transformer T15, associated with valve V4, applies a potential across resistor R9 and the principal electrodes of valve V7. At this stage of the positive half-cycle in question, however, valve V7 is non-conductive, and consequently the potential of the grid of valve V9 is not immediately altered by the energization of transformer T15. At the relatively late stage of the positive half-cycle in question, which is represented by the line b in Fig. 2, the voltage of transformer T17 reaches a sufficiently high value to render valve V7 conducting, enabling transformer T15 to pass current through the valve V7 and build up a potential across resistor R9, which opposes the bias potential continuously applied to the grid of valve V9 through rectifier V10. The potential of transformer T15 materially exceeds the bias applied through valve V10, and consequently valve V9 is rendered conducting at substantially the same instant that valve V7 becomes conducting. At the time represented by the line b, therefore, in Fig. 2, which is determined by the potentiometer position to which the tap Ia is initially moved in response to the energization of the impulsing relay R2, valve V7 operates to render the firing valve V9 conducting.

Upon being rendered conducting, valve V9 bring the potential of the igniter electrode i, associated with rectifier MV1, to approximately the same potential as the anode a of such rectifier, and consequently applies a substantial igniting potential between the igniter electrode i and the cathode c of such rectifier. The last-mentioned potential renders rectifier MV1 conductive and completes a circuit through rectifier MV1 for the primary winding of the welding transformer WT, which thereupon becomes effective to initiate a flow of welding current through the work. As will be understood, the current flow thus initiated through rectifier MV1 persists, due to the inductance of the welding load, for a period after the voltage wave E passes through the zero point, which period is approximately equal to the electrical angle between the line b (Fig. 2) and the zero point of the voltage wave in those cases in which such electrical angle is smaller than the phase angle between the welding voltage (curve E) and the welding current (curve I). As will be further understood, in those cases where the just-mentioned angle exceeds the phase angle, the welding current flow through the rectifier persists until the zero point of the current wave I is reached.

Accordingly, at the time the current thus initiated through rectifier MV1 reaches zero value, the anode of rectifier MV1 is negative and this rectifier thereupon becomes non-conducting, interrupting the flow of current to the welding transformer WT.

At the beginning of the next or negative half-cycle of current flow, the polarity of transformer T14, associated with valve V5, reverses, bringing the anode of this valve to a positive value. At this time, although a portion of the charge applied to condenser C14 has become dissipated through the associated resistor R14, the potential of condenser C14 is still sufficiently in excess of the potential of condenser C13 to render valve V5 conducting. Accordingly, at the beginning of the negative half-cycle in question, transformer T14 is enabled to pass current through valve V5 and energize the associated output transformer T16. Upon being energized, transformer T16 applies a potential across resistor R11 and the principal electrodes of valve V8 in the same manner as was described with reference to transformer T15. Also, at a point represented by the line c in Fig. 2, transformer T18 renders valve V8 conducting, which thereupon builds up a potential across resistor R11, which enables valve V7 to fire main rectifier MV2 in the same manner that main rectifier MV1 was fired at the time valve V7 was rendered conducting. Upon being rendered conducting, main rectifier MV2 transmits a negative impulse of current to the welding transformer WT of substantially the same intensity and wave form as was transmitted thereto by main rectifier MV1 during the preceding or first positive half-cycle.

At the point represented by the reference character d in Fig. 2, transformer T11 again applies its peak potential to the grid of valve V4. As previously stated, the "on" interval afforded by relay R2 is, in the example now being described, approximately three full cycles in length. Consequently, transformer T9 is still energized and effective to neutralize transformer T10 at the point d on Fig. 2. Under these conditions, therefore, transformer T12 is enabled to pass another impulse of current through valve V4, which impulse of current again energizes the output transformer T15 and recharges the timing condenser C14, associated with valve V5. As before, the energization of transformer T15 results in the firing of main rectifier MV1 and the delivery to the welding transformer of a second positive impulse of welding current. Similarly, the charging of condenser C14 enables transformer T14 to pass current through valve V5 at the beginning of the next succeeding negative half-cycle. The latter action results in the firing of main rectifier MV2 and the delivery to the welding transformer WT of a second negative impulse of welding current. Similar actions occur during the third positive and negative half-cycles, as will be apparent, and it will also be apparent that main rectifiers MV1 and MV2 are alternately fired so long as the control relay R4 maintains the synchronizing transformer T9 in an energized condition.

At a time which falls between the lines e and f in Fig. 2, control relay R4 resumes the de-energized position and reopens its contacts R4a, it being recalled that relay R4 is de-energized as a consequence of the expiration of the on period determined by condenser C2, associated with relay R2. The just-mentioned interval between the lines e and f in Fig. 2 amounts to approximately 360 electrical degrees, and this range is found to be well within the operating accuracy of condenser C2 and relays R2 and R4.

The opening of contacts R4a de-energizes the transformer T9. Accordingly, although at the time represented by the line f in Fig. 2, the peaking transformer T11 again applies a peaked potential to the grid of valve V4, such action is without effect because such peaked potential is sufficiently overcome by the now unneutralized transformer T10. The de-energization of relay R4 consequently initiates an off period during which V4 remains non-conductive and during which, consequently, main rectifiers MV1 and MV2 are not fired.

The de-energization of relay R2 at the expiration of the above-described on period also causes contacts R2b to open, which action deenergizes the winding In of the indexing relay. This action is without immediate effect in view of the holding effect of pawl 18 (Fig. 4). As aforesaid, condenser C5, associated with impulsing valve V2, is effective to maintain relay R2 de-energized for an off period of variably determinable length, which, in the present example, is assumed to be three full cycles. At a time which may fall anywhere between the dotted lines, designated g and a' in Fig. 2, the re-energization of relay R2 causes relay R4 to again become energized. The just-mentioned interval between the lines g and a' is approximately 360 electrical degrees in length, which interval is found in the practice to be well within the accuracy of the timing condenser C5 and relays R2 and R4. The re-energization of relay R2, which occurs slightly prior to the re-energization of relay R4, again causes relay contacts R2b to be energized, which, in turn, complete the energizing circuit for the winding In of the indexing relay and cause the latter to advance the potentiometer tap Ia to the next operating position. The elapsed time between the energization of relay R2 and relay R4, while very short, is found in practice to be sufficient to allow for the indexing movement of the indexing relay.

Upon being re-energized, relay R4 again closes its contacts R4a, which contacts remain closed throughout another on period, as determined by relay R2, and during which on period rectifiers MV1 and MV2 are again successively fired in the same manner as was described in detail with reference to the first on period. Throughout the second on period, however, by virtue of the adjustment of the indexing relay, transformers T17 and T18 are effective to fire their associated valves V7 and V8 at an earlier stage in each half-cycle, and consequently each increment of current delivered to the welding transformer during the second on period is of greater length and of a higher value than was the case during the first on period. This increase in current intensity is indicated in Fig. 2 by the greater area of the hatched areas.

At the conclusion of the second on period, relay R4 is again de-energized, throughout a predetermined off period, as a consequence of the de-energization of relay R2. Following this second off period, a third on period is initiated in the previously described maner. At the beginning of the third on period, the indexing relay is again actuated to alter the potentiometer setting in such relation as to enable transformers T17 and T18 o cause the main rectifiers MV1 and MV2 to be fired at a still earlier stage of the welding current wave. It will be understood, of course, that the potentiometer circuit associated with transformers T17 and T18 enables the firing point of the main rectifiers to be varied between a point only a few electrical degrees in advance of the end of each half-cycle of voltage and a point at which current is conducted to the welding circuit throughout all of each half-cycle of the current wave.

It is believed to be apparent that so long as transformer T3 is energized, it causes relay R2 to alternate between the energized and de-energized conditions, thus determining successive on and off periods. Moreover, each on period is made up of a predetermined number of half-cycles of one polarity and an equal number of half-cycles of the opposite polarity. The same is true of each off period. The proportion of each half-cycle during which current flows to the welding circuit, also, is determined by the setting of the potentiometer tap Ia, which setting is automatically varied at the beginning of each on period by the operation of the indexing relay, and causes such fractions to progressively increase from a desired minimum value to a desired maximum value.

As is indicated in Fig. 2, it is assumed that the total welding period, as determined by relay R3, amounts to three on periods, and consequently, the sequencing circuits are adjusted to cause relay R3 to become energized at approximately the time represented by the line h in Fig. 2.

It will be recalled that the initial closure of the pressure switch PS completes an energizing circuit for the transformer T7, associated with the grid of valve V3. Upon being energized, transformer T7 neutralizes the effect of transformer T6 and enables the energy initially stored in the associated timing condenser C3 to discharge through the resistor r4. Condenser C3 and resistor r4 thus determine the period, after the closure of the pressure switch PS, throughout which valve V3 remains non-conductive. At the expiration of this period, which occurs, as aforesaid, at approximately the time represented by the line h in Fig. 2, valve V3 becomes conductive and enables transformer T4 to energize relay R3.

Upon being energized, relay R3 opens its contacts R3b and closes its contacts R3a. The opening of contacts R3b interrupts the energizing circuit for transformer T3 and thus prevents further energizations of the impulsing relay R2.

Closure of relay contacts R3a completes an obvious energizing circuit for the reset coil Ir of the indexing relay, which thereupon becomes effective to enable the spring 16 (Fig. 4) to restore the potentiometer tap Ia to its initial or starting position, in readiness for the next welding operation.

Closure of relay contacts R3a also completes energizing circuits for the hold-time lamp 40 and the primary winding of transformer T2, associated with valve V1. Upon completion of the latter circuit, transformer T2 is enabled to charge condenser C1 to a potential sufficient to interrupt further flow of current through valve V1. In consequence of this action, the hold-time condenser C1', associated with relay R1, is enabled to discharge through the coil of relay R1 and maintain relay R1 energized for a variably determinable period. This hold-time period, as will be understood, is sufficient to allow the work to cool sufficiently to perfect the weld.

At the expiration of the hold-time period, relay R1 times out and opens its contents R1a and R1b. It is to be expected that the pilot switch B will be open at the time contacts R1a and R1b open, and consequently the de-energization of relay R1 interrupts the circuit for the electrode controlling valve solenoid 34 and transformer T1. The former action relieves the electrode pressure upon the work and also results in the opening of the pressure switch, as will be understood. The opening of the pressure switch interrupts the circuits for transformer T2, hold-time lamp 40, the reset coil Ir of the indexing relay, and transformers T3 and T4, thereby restoring the sequencing circuits to the conditions which existed immediately prior to the closure of the pilot switch B.

With the change-over switch S3 in the indicated closed position, a duplicate welding cycle may immediately be initiated by reclosing the pilot switch B. It will be understood that if the change-over switch S3 is opened, pilot switch B is rendered ineffective to energize the valve solenoid 34. In such case, the circuit for solenoid 34 is entirely subject to the reclosure of contacts R1a. The energization of transformer T2, which resulted in the blocking of valve V1, also charged the associated timing condenser, which remains effective after the pressure switch PS has opened and deenergized transformer T2 to maintain valve V1 in a blocked condition for a predetermined interval between welding cycles. Assuming the pilot switch B is closed at the expiration of the last-mentioned interval, a new welding cycle is initiated, which duplicates in all respects the previously described cycle.

In the modified embodiment of the invention shown in Fig. 5, the previously described indexing relay, which affected a mechanical adjustment of the potentiometer resistor Rr, is eliminated and instead the variation in the point at which valves V7 and V8 are rendered conducting is affected by introducing a progressively variable resistance into the circuit of the transformer T19, which supplies energizing current to the grid transformers T17 and T18, associated, respectively, with valves V7 and V8. Referring particularly to Fig. 5, it will be understood that the transformers T17 and T18 are related to the corresponding valves (not shown) in the previously described manner, and that voltage is supplied to these transformers from transformer T19 by way of an adjustable potentiometer circuit having the previously described general characteristics. In this instance, the circuit of the secondary winding of transformer T19 includes a pair of reversely connected valves V13 and V14, which may be and preferably are of the evacuated type, such as described in connection with valves V1, V2 and V3. It will be understood that valves V13 and V14 are effective to pass greater or lesser amounts of current, depending upon the potentials of the grids thereof with respect to the potentials of the cathodes thereof. In the present arrangement, transformers T20 and T21 are introduced in the grid circuits of valves V13 and V14, respectively, and these transformers are energized upon initial closure of the previously described disconnect switches S1 and S2, as is indicated by the direct connection of these transformers across the line conductors L1 and L2. Upon being energized, transformers T20 and T21 bring the grids of valves V13 and V14 to values at which these valves interpose a maximum resistance into the circuit of transformer T19 and, consequently, delay, to the maximum extent, the point in the load current wave at which valves V7 and V8 are rendered conducting. Upon being energized, also, transformers T20 and T21 charge up the associated biasing condensers C20 and C21.

The grid circuits of valves V13 and V14 are also provided with balancing transformers T22 and T23 which are energized at the beginning of a welding cycle in response to closure of auxiliary contacts PS1 on the previously described pressure switch. Upon being energized, transformers T22 and T23 balance out the voltages of transformers T20 and T21, and consequently render the grid potentials of valves V13 and V14 subject to the discharge actions of condensers S20 and C21. It will be understood that these latter condensers and their associated resistors R20 and R21 are adjusted so that the energy stored in condensers C20 and C21 is dissipated at a desired gradual rate, and that as the charge on these condensers progressively decrease, valves V13 and V14 interpose progressively less resistance in the circuit of transformer T19. As before, the condensers in the circuit of transformer T19 are preferably proportioned so that the voltage across the potentiometer resistor is leading with respect to the voltage of transformer T19, and it will be understood that the reduction in resistance of the valves V13 and V14 serves to increase this angle of lead, thereby progressively advancing the points in the corresponding half cycles at which the valves V7 and V8 are fired. During the discharge action of condensers C20 and C21, therefore, the point at which valves V7 and V8 are rendered conducting is progressively advanced, thereby progressively increasing the intensity of each impulse of welding current in the previously described manner. The phase shifting arrangement of Fig. 5 is claimed in applicant's copending application Serial No. 121,576, filed October 15, 1949, as a continuation-in-part of Serial No. 610,351, filed August 11, 1946, now abandoned, as a division hereof.

It will be appreciated that various modifications may be made in the herein described embodiment of the invention without departing from the spirit and scope of the invention.

What is claimed is:

1. In a control system for controlling the flow of current between a load circuit and a source of alterating current, the combination of a pair of rectifiers interposed between said source and said load circuit and disposed to pass half cycles of respectively opposite polarity of said source, a synchronizing network for said rectifiers comprising first and second control valves, said network further comprising means for transmitting an impulse of current from said source through [one of] said *first* control valve[s] during a said half cycle of one polarity, means rendering the corresponding rectifier operably energized by said impulse, means responsive to said impulse for conditioning said second control valve to pass current whereby to enable said source to transmit a second impulse through said second control valve during the succeeding half cycle of opposite polarity, and means rendering the said other rectifier operably responsive to said second impulse.

2. In a control system for controlling the flow of current between a load circuit and a source of alternating current, the combination of a pair of rectifiers interposed between said source and said load circuit and disposed to pass half cycles of respectively opposite polarity of said source, a synchronizing network for said rectifiers comprising first and second control valves, said network further comprising means for transmitting an impulse of current from said source through [one of] said *first* control valve[s] during a said half cycle of one polarity, means rendering the corresponding rectifier operably responsive to said impulse, means responsive to said impulse for storing a portion thereof and for consequently enabling said source to transmit a second impulse through said second control valve during the succeeding half cycle of opposite polarity, means rendering the [said] other *of said* rectifiers operably responsive to said second impulse, and means operatively associated with said rectifiers to control the points in said half cycles at which the rectifiers respond to the corresponding said impulses.

3. In a control system for controlling the flow of current between a load circuit and a source of alternating current, the combination of a pair of rectifiers interposed between said source and said load circuit and disposed to pass half cycles of respectively opposite polarity of said source, a synchronizing network for said rectifiers comprising first and second control valves, said network further comprising means for transmitting an impulse of current from said source through [one of] said *first* control valve[s] during a said half cycle of one polarity, means rendering the corresponding rectifier operably responsive to said impulse, means responsive to said impulse for storing a portion thereof and for consequently enabling said source to transmit a second impulse through said second control valve during the succeeding half cycle of opposite polarity, means rendering the [said] other *of said* rectifiers operably responsive to said second impulse, and means for automatically and progressively altering the points in said half cycles at which the rectifiers respond to the corresponding said impulses.

4. In a control system for controlling the flow of current between a load circuit and a source of alternating current, the combination of a pair of rectifiers interposed between said source and said load circuit and disposed to pass half cycles of respectively opposite polarity of said source, a synchronizing network for said rectifiers comprising first and second control valves, said network further comprising means for transmitting an impulse of current from said source through [one of] said *first* control valve[s] during a said half cycle of one polarity, means rendering the corresponding rectifier operably responsive to said impulse, means responsive to said impulse for storing a portion thereof and for consequently enabling said source to transmit a second impulse through said second control valve during the succeeding half cycle of opposite polarity, means rendering the [said] other *of said* rectifiers operably responsive to said second impulse, and indexing means progressively operable as an incident to successive actuations of said synchronizing network for controlling the points in said half cycles at which said rectifiers respond to the corresponding said impulses.

5. In a control system for controlling the flow of current between a load circuit and a source of alternating current, the combination of a pair of rectifiers interposed between said source and said load circuit and disposed to pass half cycles of respectively opposite polarity of said source, a firing valve individual to each said rectifier, a synchronizing network for said firing valves comprising first and second control valves individual thereto, said network further comprising means for transmitting an impulse of current from said source through [one of] said *first* control valve[s] during a said half cycle of one polarity, means rendering the corresponding firing valve operably responsive to said impulse and effective to fire the corresponding rectifier upon delivery of said impulse, means responsive to said impulse for storing a portion thereof and for consequently enabling said source to transmit a second impulse through said second control valve during the succeeding half cycle of opposite polarity, and means rendering the [said] other *said* firing valve *associated with said second control valve* operably responsive to said second impulse and effective upon delivery thereof to fire the *said* [corresponding] rectifier *corresponding with said other firing valve.*

6. In a control system for controlling the flow of current between a load circuit and a source of alternating current, the combination of a pair of rectifiers interposed between said source and said load circuit and disposed to pass half cycles of respectively opposite polarity of said source, a firing valve individual to each said rectifier, a synchronizing network for said firing valves comprising first and second control valves individual thereto, said network further comprising means for transmitting an impulse of current from said source through [one of] said *first* control valve[s] during a said half cycle of one polarity, means rendering the corresponding firing valve operably responsive to said impulse and effective to fire the corresponding rectifier upon delivery of said impulse, means responsive to said impulse for storing a portion thereof and for consequently enabling said source to transmit a second impulse through said second valve during the succeeding half cycle of opposite polarity, means rendering the *other* said [other] firing valve *associated with said second control valve* operably responsive to said second impulse and effective upon delivery thereof to fire the [corresponding] rectifier *corresponding with said other firing valve,* and indexing means progressively operable as an incident to successive actuations of said synchronizing network for controlling the points in said half cycles at which said firing valves respond to the corresponding said impulses.

7. In a control system for controlling the flow of current between a load circuit and a source of alternating current, the combination of a pair of rectifiers interposed between said source and said load circuit and disposed to pass half cycles of respectively opposite polarity of said source, a synchronizing network for said rectifiers comprising first and second control valves, said network further comprising means for transmitting an impulse of current from said source through [one of] said *first* control valve[s] during a said half cycle of one polarity, means rendering the corresponding rectifier operably responsive to said impulse, means responsive to said impulse for storing a portion thereof and for consequently enabling said source to transmit a second impulse through said second control valve during the succeeding half cycle of opposite polarity, means rendering the [said] other *of said* rectifiers operably responsive to said second impulse, and indexing means comprising an electromagnetically operable potentiometer element responsive to successive actuations of said synchronizing network for controlling the points in said half cycles at which said rectifiers respond to the corresponding said impulses.

8. In a control system for controlling the flow of current between a load circuit and a source of alternating current, the combination of a pair of rectifiers interposed between said source and said load circuit and disposed to pass half cycles of respectively opposite polarity of said source, a synchronizing network for said rectifiers comprising first and second control valves, said network further comprising means for transmitting an impulse of current from said source through [one of] said *first* control valve[s] during a said half cycle of one polarity, means rendering the corresponding rectifier operably responsive to said impulse, means responsive to said impulse for storing a portion thereof and for consequently enabling said source to transmit a second impulse through said second control valve during the succeeding half cycle of opposite polarity, means rendering the [said] other *of said* rectifiers operably responsive to said second impulse, and indexing means comprising at least one valve of the evacuated type having means for progressively varying the conductivity thereof for controlling the points in said half cycles at which said rectifiers respond to the corresponding said impulses.

9. In a control system for controlling the flow of current between a load circuit and a source of alternating current, the combination of a pair of rectifiers interposed between said source and said load circuit and disposed to pass half cycles of respectively opposite polarity of said source, a synchronizing network for said rectifiers comprising first and second control valves, said network further comprising means for transmitting an impulse of current from said source through [one of] said *first* control valve[s] during a said half cycle of one polarity, means rendering the corresponding rectifier operably responsive to said impulse, means responsive to said impulse for storing a portion thereof and for consequently enabling said source to transmit a second impulse through said second control valve during the succeeding half cycle of opposite polarity, means rendering the [said] other *of said* rectifiers operably responsive to said second impulse, and sequencing means operable to provide successive on and off timing periods, said sequencing means operating to supply impulses to said sychronizing network during each on period, and operating to prevent the delivery of said impulses during each said off period.

10. In a control system for controlling the flow of current between a load circuit and a source of alternating current, the combination of a pair of rectifiers interposed between said source and said load circuit and disposed to pass half cycles of respectively opposite polarity of said source, a synchronizing network for said rectifiers comprising first and second control valves, means normally maintaining said control valves non-conductive, means comprising means for producing an impulse of peaked wave form for rendering [one of] said *first* control valve[s] conductive at a predetermined point in a said half cycle of one polarity whereby to enable said source to transmit an impulse of current through said one valve, means rendering the corresponding rectifier operably responsive to said impulse additional means responsive to said impulse for storing a portion thereof and for enabling said stored portion to render said [other] *second* control valve conductive during the succeeding half cycle of opposite polarity whereby to enable said source to transmit a second impulse through said second control valve during said succeeding half cycle, and means rendering the [said] other *of said* rectifiers operably responsive to said second impulse.

11. In a control system for association with a source of alternating current, first and second control valves, means for transmitting an impulse of current from said source through [one of] said *first* valve[s] during a half cycle of one polarity, a first translating means responsive to said impulse, additional means responsive to said impulse for storing a portion thereof and for consequently enabling said source to transmit a second impulse through said second control valve during a succeeding half cycle of opposite polarity, and a second translating means operably responsive to said second impulse, said first translating means being nonresponsive to said second impulse and said second translating means being nonresponsive except [after delivery of] *to* said second impulse.

12. In a control system for association with a source of alternating current, first and second control valves, means for normally applying a nonconductive bias to said valves, means operable at a predetermined point in a half cycle of one polarity for overcoming the bias of [one of] said *first* control valve[s] and for enabling said source to transmit an impulse of current therethrough, means responsive to said impulse for storing a portion thereof, means effective during a succeeding half cycle of opposite polarity to enable said stored portion to overcome the bias of said second control valve and thereby enable said source to transmit a second impulse of current therethrough, and first and second translating means operably responsive to said first and second impulses, said first translating means being nonresponsive to said second impulse and said second translating means being nonresponsive except [after delivery of] *to* said second impulse.

13. In a control system for association with a source of alternating current, first and second control valves, means for normally applying a nonconductive bias to said valves, means operable at a predetermined point in a half cycle of one polarity for overcoming the bias of [one of] said *first* control valve[s] and for enabling said source to transmit an impulse of current therethrough, means including a rectifier responsive to said impulse for storing a portion thereof, said stored portion being effective during a succeeding half cycle of opposite polarity to overcome the bias of said second control valve, and first and second translating means operably responsive to said impulses, said first translating means being nonresponsive to said second impulse and said second translating means being nonresponsive except [after delivery of] *to* said second impulse.

14. In a control system for association with a source of alternating current, first and second control valves, means normally applying a nonconductive bias to said valves, means comprising means for producing during half cycles of one polarity an impulse of peaked wave form for overcoming the bias of [one of] said *first* valve[s] and enabling said source to transmit a first impulse of current through said *first* [one] valve, means for storing a portion of said first impulse and for enabling said portion to overcome the bias of said *second* [other] control valve during a succeeding half cycle of opposite polarity whereby to enable said source to transmit a second impulse of current through said *second* [other] control valve during said succeeding half cycle, and first and second translating means operably responsive to said first and second impulses, said first translating means being nonresponsive to said second impulse and said second translating means being nonresponsive except [after delivery of] *to* said second impulse.

15. In a control system for association with a source of alternating current, the combination of a pair of translating [means] *devices* disposed to be operated during half-cycles respectively opposite polarity of said source, a synchronizing network for controlling the operation of said devices and comprising first and second control valves, said network further comprising means for transmitting an impulse of current from said source through [one of] said *first* control valve[s] during a half-cycle of one polarity, means providing two current paths through which said impulse of current flows, means coupling one of said paths to one of said devices whereby said impulse causes operation of said one device during said half-cycle of one polarity, means including energy storing means coupled to the other path for storing a portion of said impulse, means coupling said last-mentioned means to said second control valve in such relation that said source is enabled to transmit a second impulse through said second control valve during the succeeding half-cycle of opposite polarity, and means rendering the other *of* said devices operably responsive to said second impulse.

16. In a control system for controlling flow of current between a work circuit and a source of periodic current, electric valve means for controlling said flow, control means for actuating said valve means to enable said flow during a succession of periods of said source, said control means including means for producing a succession of impulses having a uniform periodicity which is a multiple of the periodicity of the source, and means including phase shift means for shifting the phase of said impulses relative to the periods of the source for causing the portions of the said periods throughout which said flow occurs to vary in accordance with a predetermined pattern, one of said varying and control means being operably responsive to the other.

17. In a control system for controlling flow of current between a work circuit and a source of periodic current, electric valve means for controlling said flow, control means for actuating said valve means to enable said flow during a succession of periods of said source, said control means including means for producing a succession of impulses having a uniform periodicity which is a multiple of the periodicity of the source, and means including phase shift means for shifting the phase of said impulses relative to the periods of the source for causing the portions of the said periods throughout which said flow occurs to vary in accordance with a predetermined pattern, said varying and control means operating in timed relation to each other.

18. In a control system for controlling the flow of current between a work circuit and a source of periodic current, means including an electric valve for controlling said flow, control means for initiating the operation of said valve including means for causing it to enable a said flow during each of a predetermined succession of periods of said source, said control means including means for producing a succession of impulses having a uniform periodicity which is a multiple of the periodicity of the source, and means including phase shift means for shifting the phase of said impulses relative to the periods of the source operable to determine the portion of each said period throughout which said flow occurs and to cause said portions to vary, during a said succession, in accordance with a predetermined pattern.

19. The system of claim 18 wherein the said variation is caused by varying means which operates in predeterminedly timed relation to the operation of said actuating means.

20. In a control system for controlling the flow of current between a work circuit and a source of periodic current, means including an electric valve for controlling said flow control means for initiating the operation of said valve in each period, of a succession of periods, in which said flow is to occur, said control means including means for producing a succession of impulses having a uniform periodicity which is a multiple of the periodicity of the source, and means including phase shift means for shifting the phase of said impulses relative to the periods of the source operable to determine the portion of each last-mentioned period throughout which said flow occurs and to cause said portions to vary during a said succession in accordance with a pattern which is predeterminable prior to actuation of said initiating means.

21. The system of claim 20 wherein the said varying means is operably responsive to the said initiating means.

22. In a control system for controlling the flow of current between a load circuit and a source of periodically varying current, the combination of a rectifier interposed between said source and said load circuit and disposed to pass current during successive periods of said source, control means including means for actuating said rectifier during each period in which it is to pass current, said control means including means for producing a succession of impulses having a uniform periodicity which is a multiple of the periodicity of the source, and means including phase shift means for shifting the phase of said impulses relative to the periods of the source controlled by said control means and operable automatically in accordance with a predetermined pattern for progressively varying the point in each said period at which said rectifier is actuated.

23. In a control system for controlling the flow of current between a load circuit and a source of periodically varying current, the combination of a normally nonconductive rectifier of the type which becomes conductive upon the application of a firing potential thereto for controlling said flow, control means including means for applying said firing potential during each period of said source in which said rectifier is to be conductive, said control means including means for producing a succession of impulses having a uniform periodicity which is a multiple of the periodicity of the source, and means including phase shift means for shifting the phase of said impulses relative to the periods of the source controlled by said control means and operable automatically for progressively varying the point in each said period at which said firing potential is applied, said indexing means being operably independent of current passed by said rectifier but serving to control the flow of such current.

24. In a control system for a plurality of electric discharge devices each having principal electrodes and a control element, a pair of valves each having principal electrodes and a control electrode, means responsive to flow of current between said principal electrodes of said valves for applying actuating potentials between the corresponding control element and a corresponding principal electrode of a said device, means normally applying a blocking potential to the control electrode of one of said valves, means associated with the control electrode of the other said valve for rendering the same conducting, and means responsive to the conducting character of said [one] *other* valve for overcoming said blocking potential on said one valve and rendering the same conducting, said last-mentioned means being operably independent of the operation of the said device corresponding to said [one] *other* valve.

GUSTAV E. UNDY.

REFERENCES CITED

The following references are of record in the file of this patent and the original patent:

UNITED STATES PATENTS

| Number | Name | Date |
|---|---|---|
| 1,914,193 | Bedford | June 13, 1933 |
| 1,995,810 | Klemperer | Mar. 26, 1935 |
| 2,005,892 | Gulliksen | June 25, 1935 |
| 2,078,152 | Moyer | Apr. 20, 1937 |
| 2,166,306 | LeVoy, Jr. | July 18, 1939 |
| 2,169,023 | Dawson | Aug. 8, 1939 |
| 2,175,920 | Schnarz | Oct. 10, 1939 |
| 2,175,921 | Schnarz | Oct. 10, 1939 |
| 2,202,205 | Howe | May 28, 1940 |
| 2,250,202 | Matusita | July 22, 1941 |
| 2,270,799 | Gulliksen | Jan. 20, 1942 |
| 2,314,691 | Dawson et al. | Mar. 23, 1943 |

FOREIGN PATENTS

| Number | Country | Date |
|---|---|---|
| 473,889 | Great Britain | Oct. 18, 1937 |
| 747,996 | France | Apr. 10, 1933 |

Certificate of Correction

Reissue No. 23,208 March 14, 1950

GUSTAV E. UNDY

It is hereby certified that errors appear in the printed specification of the above numbered patent requiring correction as follows:

Column 2, line 30, after the word "modified" insert indexing ; column 13, line 57, for "maner" read manner ; line 61, for "o cause" read to cause ; column 16, line 2, for "condensers S20 and C21" read condensers C20 and C21 ; column 20, line 73, before "respectively" insert of ;

and that the said Letters Patent should be read with these corrections therein that the same may conform to the record of the case in the Patent Office.

Signed and sealed this 20th day of June, A. D. 1950.

[SEAL]

THOMAS F. MURPHY,
*Assistant Commissioner of Patents.*